3,170,234
JOINTING OF REFRACTORY METALS BY SOLID-STATE DIFFUSION BONDING
Charles O. Tarr, Cincinnati, Ohio, assignor to the United States of America as represented by the United States Atomic Energy Commission
No Drawing. Filed Sept. 17, 1962, Ser. No. 224,262
10 Claims. (Cl. 29—488)

My invention relates to a method of joining refractory metals.

Refractory metals such as tungsten, tantalum, molybdenum and columbium and their alloys are useful for numerous high-temperature applications in the nuclear energy and space fields. Various problems have been presented in joining these metals. In fusion methods such as welding and brazing, the use of braze alloys or filler material has frequenly resulted in lowering of the base metal melting point at the joint, thus decreasing the suitability of the metal for high-temperature use. In addition, the joints obtained by these methods often tend to be brittle. In the case of fabricating complex assemblies such as corrugated or honeycomb-type structures designed for high strength and low weight, these methods are impractical because of the complicated positioning and manipulation required. For joining thin sheets of metal to thick pieces, fusion techniques produce distortion since the thick piece acts as a heat sink, and the thin sheet melts and flows before the thick piece reaches fusion temperature. It may be readily seen that an improved joining method would facilitate use of these metals.

It is, therefore, an object of my invention to provide a method of joining refractory metals.

Another object is to provide a method of joining tungsten, tantalum, molybdenum, columbium, rhenium and vanadium and their alloys.

Another object is to provide a method of joining said metals without fusion of the joining surface.

Other objects and advantages of my invention will be apparent from the following detailed description and claims appended hereto.

In accordance with my invention, refractory metals are joined to themselves and to one another by bringing substantially oxide-free surfaces of said metals into contact under a protective atmosphere at a temperature of at least 1350° C. and below the melting point of the lowest-melting metal. A strong metallurgical bond having essentially the properties of the base metal is obtained by solid-state diffusion bonding. Only a minimal pressure across the interface is required, and complex structures may be fabricated merely by holding the components thereof lightly in position during bonding. This method does not require fusion at the joining surface so that brittle compound formation and distortion are avoided.

I have found that solid-state diffusion bonding of refractory metals is readily effected by merely bringing oxide-free surfaces of the metal into contact in a protective atmosphere at a temperature above about 1350° C., depending on the particular metal and the surface condition. Although my invention is not to be understood as limited to a particular theory, it is postulated that grain-boundary migration across the metal contact plane is the major mechanism by which a bond is obtained. In addition, bonding partially results from the change of the contact plane to a normal grain boundary without significant migration. Under the preferred vacuum conditions, the oxides of these metals are relatively volatile or soluble in the base metal at the bonding temperature, and are thus not present at the interface to interfere with bonding.

The method of my invention is primarily applicable to refractory metals in the group consisting of tungsten, tantalum, molybdenum, columbium, rhenium and vanadium and to alloys consisting of a combination of these metals. Alloys of particular interest for high temperature use are tungsten—26 weight percent rhenium, tantalum—10 weight percent tungsten, and molybdenum—50 weight percent rhenium. Other lower-melting metals and alloys are also susceptible to diffusion bonding, provided that suitable surface characteristics are established. However, owing to such factors as the formation of intermetallic compounds and unfavorable grain structure, the application of this method to a particular metal or combination of metals outside this group cannot be stated with certainty. In general, alloys containing a total of at least 25 weight percent of one or more of the above metals and the balance metals outside this group may be joined by this method.

The temperature required for bonding varies with the particular metal or combination of metals and the surface condition. The temperature is decreased with smoother surface finishes and with finer grain structure. For the most favorable conditions, such as when joining a very smooth, fine grained tungsten foil to the other metals, the minimum temperature of about 1350° C. to 1400° C. may be employed. For commonly available sheet material produced by cold-rolling, a temperature of at least about 1600° C. is required. Except for very smooth material, higher temperatures are required for joining tungsten and tantalum to themselves and to the other metals than are required for the other metals or combination. The exact temperature required for bonding a given set of metals and surface conditions may be determined empirically by incrementally heating the metal assembly until a bond begins to form. A temperature up to the melting point of the lowest-melting metal being joined may be employed. The metal assembly is maintained at this temperature to obtain complete bonding, with a period of about one hour normally being sufficient. Longer periods are normally required with decreasing temperatures.

The use of a protective atmosphere and a substantially oxide-free metal surface are critical to the method of my invention. An atmosphere of an inert gas such as helium or a vacuum may be employed. Vacuum conditions are preferred since the oxides of these metals are relatively volatile or soluble in the base metal at the temperatures employed, and attainment of an oxide-free surface is facilitated. A vacuum pressure not exceeding about $1 \times 10^{-5}$ millimeters of mercury is suitable for this purpose. Oxides may also be removed from the metal surface by mechanical means such as vapor blasting or by chemical treatment with an acid solution, e.g., a lactic-hydrofluoric-nitric acid solution at volume proportions of 3:1:1, respectively. Except for the substantial absence of oxides, the condition of the metal surface is not critical. Maximum smoothness, however, is preferred, along with a fine-grained structure such as is obtained by cold working, e.g., cold rolling.

The pressure employed in bringing the metal surfaces into contact is not critical, and the metal pieces may merely be stacked on one another in the desired geometric relationship. In order to insure that good contact exists, however, it is preferred to clamp or otherwise force the pieces together at a low pressure such as 5 pounds per square inch.

In an alternative embodiment of my invention, tungsten, tantalum, molybdenum and columbium and alloys comprising a major portion of these metals may be joined to themselves and to one another by disposing a layer of vanadium or titanium between the metal surfaces. The resulting assembly may be bonded by heating to a temperature of about 1400° C. to 1650° C. This method is advantageous in that bonding is effected at a lower temperature than would otherwise be required, except for very smooth, fine-grained material. The interposed layer may be in the form of a sheet or foil of metal, preferably 0.005 to 0.001 inch thick, or dispersed, finely divided metal powder or metal hydride. Positioning of metal powder or hydride may be enhanced by employing a volatile paste or binder such as collodion.

In another embodiment of my invention the metals and alloys listed above may be joined to themselves by disposing a thin layer of the same metal between the joining surfaces in the same manner as for the inserted vanadium or titanium layer. Metal foil 0.005 to 0.001 inch thick, finely divided metal powder or metal hydride may be employed. For powdered material, dispersion in a volatile paste is preferred. Surface contact is improved by the interposed material and the temperature required for bonding is decreased. This measure is preferred where the surfaces of the metals being joined are relatively rough so that bonding would otherwise occur only at a limited number of contact points.

My invention is illustrated by the following specific examples.

EXAMPLE I

Five refractory metals were bonded to themselves and to one another by means of the following procedure: Metal sheets ½ inch by ½ inch and .010 inch thick and having a smooth finish produced by cold-rolling were placed in contact at a pressure of 5 pounds per square inch. The resulting assemblies were heated in a furnace at a vacuum of $1 \times 10^{-5}$ millimeters of mercury for one hour each at 1400° C. and successively higher temperatures until the sheets were bonded. The temperatures required for bonding the metal couples are given in the following table.

*Table I*

BONDING TEMPERATURES FOR REFRACTORY METALS (° C.)

| Metal Couples | W | Ta | Mo | Cb | Va |
|---|---|---|---|---|---|
| Tungsten | 1,950 | 1,950 | 1,600 | 1,600 | 1,400 |
| Tantalum | 1,950 | 1,950 | 1,600 | 1,600 | 1,400 |
| Molybdenum | 1,600 | 1,600 | 1,600 | 1,600 | 1,400 |
| Columbium | 1,600 | 1,600 | 1,600 | 1,600 | 1,400 |
| Vanadium | 1,400 | 1,400 | 1,400 | 1,400 | 1,400 |

These temperatures are typical for bonding conventional type finish sheet material.

EXAMPLE II

Tungsten foil and two types of sheet tungsten were bonded to themselves, to one another and to tantalum, molybdenum, columbium, vanadium, tungsten—26 weight percent rhenium alloy and tantalum—10 weight percent tungsten alloy. The tungsten foil was 0.0015 inch thick and had a very smooth surface with a fine fragmented grain structure produced by cold-working and stress-relief treatments. One type of tungsten sheet was 0.030 inch thick and had a surface characteristic conventionally referred to as "standard finish," that is, a finish produced by "warm" rolling of sintered powder. The other type of tungsten sheet was 0.005 inch thick "bright finish," that is, a finish produced by rolling at low temperature on rolling mills equipped with highly polished hard carbide work rolls. The remaining metals and alloys were .010 inch thick sheet material with a smooth dense surface produced by cold-rolling. For each metal couple, sheets ½ inch by ½ inch were placed in contact at a pressure of about one ounce per square inch and heated by the procedure of Example I. The results obtained may be seen by reference to the following table.

*Table II*

TEMPERATURE REQUIRED FOR BONDING TUNGSTEN FOIL AND SHEET MATERIAL (° C.)

| Materials Bonded | W Foil | 0.03 W | 0.005 W | Ta | Mo | Cb | V | W-26 Re | Ta-10 W |
|---|---|---|---|---|---|---|---|---|---|
| Tungsten Foil | 1,365 | [1] 1,365 | [1] 1,365 | 1,365 | 1,365 | 1,365 | 1,365 | 1,365 | 1,365 |
| Tungsten Sheet (0.03 inch—standard finish) | [1] 1,365 | 2,480 | 2,200 | 2,200 | 2,200 | 1,955 | 1,365 | 2,480 | 2,200 |
| Tungsten Sheet (0.005 inch—bright finish) | [1] 1,365 | 2,200 | 1,955 | 1,955 | 1,600 | 1,600 | 1,365 | 2,480 | 1,955 |

[1] Local or spot binding at contact points.

It may be seen from the above that the bonding temperature is substantially decreased for very smooth foil material.

EXAMPLE III

Two molybdenum sheets ½ inch by ½ inch and 0.002 inch thick were bonded by heating in a vacuum of $1 \times 10^{-5}$ mm. Hg for one hour at 1650° C. at a pressure of 5 pounds per square inch. The resulting joint was etched with a lactic-nitric-hydrofluoric acid solution (6–2–1 volume ratio) and photographed at a magnification of 250×. Examination of the photograph revealed that the original interface was indistinguishable from the base metal, the grains of the two sheets having grown completely into one another to produce a continuous structure.

EXAMPLE IV

Stress-rupture testing was performed on tantalum—10 weight percent tungsten alloy joined by the method of my invention to determine the strength of the bonded joint. Test specimens of 0.20 inch thick sheet material with a one inch long test section and a ¼ inch test section width were prepared with a bonded overlap of ¼ inch. Bonding was effected by heating the overlapping sheets in a vacuum of $1 \times 10^{-5}$ mm. Hg at 2200° C. for 4 hours. The bonded specimens, along with control specimens without a joint and specimens joined by electron-beam welding, were tested by applying a constant stress of 600 or 1000 pounds per square inch parallel to the rolling direction at 2600° C. in a hydrogen atmosphere and observing the time when the specimen ruptured. The elongation of the specimen in one inch gage length was also measured. The results of the tests may be seen by reference to the following table.

*Table III*

STRESS-RUPTURE TESTS OF Ta-10 W ALLOY AT 2,600° C

| Specimen No. | Joining Method | Stress, p.s.i. | Rupture Time, hours | Elongation (percent) |
|---|---|---|---|---|
| 1 | Control—no joint | 1,000 | 1.35 | 110.0 |
| 2 | do | 1,000 | 1.58 | 129.0 |
| 3 | Electron—beam welded | 1,000 | 1.38 | 84.0 |
| 4 | Diffusion bonded | 1,000 | 1.53 | 88.0 |
| 5 | Control—no joint | 600 | 9.20 | 136.0 |
| 6 | do | 600 | 8.1 | 109.0 |
| 7 | Electron-beam welded | 600 | 9.1 | |
| 8 | Diffusion bonded | 600 | 7.87 | 99.5 |

It may be seen from the above that a high-strength joint is obtained by diffusion bonding. In each case, rupture of the bonded specimen occurred at some point other than the joint interface.

EXAMPLE V

Tantalum sheet specimens 0.01 inch thick joined by diffusion bonding were subjected to stress-rupture tests in the manner of Example IV. The specimens were bonded by heating overlapping sheets for one hour at 2200° C. in a vacuum of $1 \times 10^{-5}$ mm. Hg, the sheets being contacted at a pressure of 2 p.s.i. Control specimens without a joint and electron-beam welded specimens were also tested. The tests were conducted in a hydrogen atmosphere at 2600° C. The results obtained may be seen by reference to the following table.

*Table IV*

STRESS RUPTURE TESTS OF DIFFUSION BONDED TANTALUM

| Specimen No. | Joining Method | Stress, p.s.i. | Rupture Time, hours | Elongation (percent) |
|---|---|---|---|---|
| 1 | Control | 300 | .27 | 75.0 |
| 2 | do | 250 | .53 | 67.5 |
| 3 | do | 200 | 1.35 | 48.0 |
| 4 | Diffusion bonded | 200 | 1.1 | 75.0 |
| 5 | Electron-beam welded | 200 | 1.24 | |
| 6 | Control | 150 | 8.13 | 66.0 |
| 7 | Diffusion bonded | 150 | 6.75 | 66.5 |
| 8 | Electron-beam welded | 150 | 7.2 | 46.0 |

EXAMPLE VI

Molybdenum sheet specimens 0.001 inch thick were diffusion bonded and the resulting joints were tested by the procedures of Example IV. The specimens were bonded by heating for 1 hour at 1955° C. in a vacuum of $1 \times 10^{-5}$ mm. Hg. The overlapping surfaces were held in contact at a pressure of 2 p.s.i. Stress rupture testing was carried out at 2200° C. in a hydrogen atmosphere. The results obtained may be seen by reference to the following table.

*Table V*

STRESS RUPTURE TESTING OF DIFFUSION BONDED MOLYBDENUM

| Specimen No. | Joining Method | Stress, p.s.i. | Rupture Time, hours | Elongation (percent) |
|---|---|---|---|---|
| 1 | Control | 1,000 | 1.73 | 19.0 |
| 2 | Diffusion bonded | 1,000 | 1.33 | 11.0 |
| 3 | Control | 750 | 3.83 | 19.0 |
| 4 | Diffusion bonded | 750 | 3.20 | 17.0 |
| 5 | Control | 600 | 5.05 | 30.5 |
| 6 | Diffusion bonded | 600 | 4.46 | 6.5 |

EXAMPLE VII

Three tungsten sheets 0.005 inch thick and 1 inch by 1¾ inches and having a smooth foil type finish were stacked between two molybdenum blocks weighing a total of 5 pounds. The resulting assembly was heated for 1 hour at 1950° C. in a vacuum of $1 \times 10^{-5}$ mm. Hg. The components were thoroughly bonded by this procedure, and the tungsten sheet shattered without separation of the joints upon applying force to the assembly at room temperature.

The above examples are merely illustrative and are not to be understood as limiting the scope of my invention, which is limited only as indicated by the appended claims. It is also to be understood that variations in apparatus and procedure may be employed by one skilled in the art without departing from the scope of my invention.

Having thus described my invention, I claim:

1. The method of joining refractory metals in the group consisting of tungsten, tantalum, columbium, molybdenum, rhenium and vanadium and alloys consisting of a combination thereof to themselves and one another which comprises bringing smooth oxide-free surfaces of said metals into contact at a relatively low pressure and at a temperature of at least 1350° C. and below the melting point of the lowest-melting metal being joined in a protective atmosphere, whereby said surfaces are bonded.

2. The method of joining metal parts consisting of at least one refractory metal selected from the group consisting of tungsten, tantalum, rhenium, molybdenum, columbium, and vanadium and alloys consisting of a combination thereof to themselves and one another which comprises bringing smooth, oxide-free surfaces of said parts into contact under vacuum at a relatively low pressure and at a temperature of at least 1350° C. and below the melting point of said parts, whereby said surfaces are bonded.

3. The method of claim 2 wherein said surfaces are brought into contact under a vacuum pressure not exceeding about $1.0 \times 10^{-5}$ millimeters of mercury.

4. The method of claim 2 wherein at least one of said parts is smooth, fine grained sheet material produced by cold-working.

5. The method of claim 2 wherein said surfaces are brought into contact at a pressure not exceeding about 5 pounds per square inch.

6. The method of joining refractory metal parts consisting of at least one refractory metal in the group consisting of tungsten, tantalum, rhenium, columbium, molybdenum and vanadium and alloy combinations thereof which comprises interposing a thin layer of a metal selected from said group between said parts and bringing oxide-free surfaces of said parts and said layer into contact at a relatively low pressure under vacuum at a temperature of at least about 1350° C. and below the melting points of said parts and said layer whereby said parts are bonded together.

7. The method of claim 6 wherein said layer is a smooth, fine grained metal foil about 0.005 inch to 0.001 inch thick.

8. The method of claim 6 wherein said layer consists of finely divided metal powder dispersed in a volatile binder.

9. The method of claim 6 wherein said layer consists of finely divided metal hydride dispersed in a volatile binder.

10. The method of claim 6 wherein said surfaces are brought into contact at a pressure not exceeding about 5 pounds per square inch.

References Cited by the Examiner

UNITED STATES PATENTS

| 2,168,185 | 8/39 | Alexander | 29—494 |
| 2,857,663 | 10/58 | Beggs | 29—504 XR |
| 3,088,192 | 5/63 | Turner | 29—504 XR |

FOREIGN PATENTS 609,035  9/48  Great Britain.

JOHN F. CAMPBELL, *Primary Examiner.*